United States Patent
Sacha et al.

(10) Patent No.: US 9,439,006 B2
(45) Date of Patent: *Sep. 6, 2016

(54) REMOTE CONTROL FOR A HEARING ASSISTANCE DEVICE

(71) Applicant: Starkey Laboratories, Inc., Eden Prairie, MN (US)

(72) Inventors: Michael Karl Sacha, Chanhassen, MN (US); Wei Li Lin, Plymouth, MN (US); Jay Ashwin Shah, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,173

(22) Filed: Nov. 17, 2014

(65) Prior Publication Data

US 2015/0172835 A1 Jun. 18, 2015

Related U.S. Application Data

(62) Division of application No. 12/823,505, filed on Jun. 25, 2010, now Pat. No. 8,891,793.

(60) Provisional application No. 61/220,994, filed on Jun. 26, 2009.

(51) Int. Cl.
*H04R 25/00* (2006.01)
*H04B 1/3827* (2015.01)

(52) U.S. Cl.
CPC .......... *H04R 25/558* (2013.01); *H04R 25/505* (2013.01); *H04B 1/385* (2013.01); *H04R 25/552* (2013.01); *H04R 25/554* (2013.01); *H04R 2225/55* (2013.01)

(58) Field of Classification Search
CPC .............. H04R 25/558; H04R 25/505; H04R 2225/55; H04R 25/552; H04R 25/554
See application file for complete search history.

(56) References Cited

U.S. PATENT DOCUMENTS 5,083,312 A 1/1992 Newton et al.
5,721,783 A 2/1998 Anderson (Continued)

FOREIGN PATENT DOCUMENTS

EP 2012557 A2 1/2009
WO WO-9641498 A1 12/1996

(Continued)

OTHER PUBLICATIONS

"U.S. Appl. No. 12/776,038, Non Final Office Action mailed Sep. 27, 2012", 9 pgs.

(Continued)

*Primary Examiner* — Tuan D Nguyen
(74) *Attorney, Agent, or Firm* — Schwegman Lundberg & Woessner, P.A.

(57) ABSTRACT

The present subject matter provides systems and methods for remotely controlling a hearing assistance device, including using a personal wireless device such as a cellular telephone. One embodiment includes a communication system for controlling a hearing assistance device. The system includes a personal wireless device including a short range radio transmitter. The short range radio transmitter is programmed to transmit instructions to the hearing assistance device by conversion of inputs to the personal wireless device into control signals for the hearing assistance device using on/off keying of the short range radio transmitter.

19 Claims, 6 Drawing Sheets

(56) References Cited

U.S. PATENT DOCUMENTS

| | | | |
|---|---|---|---|
| 5,768,397 | A | 6/1998 | Fazio |
| 6,021,207 | A | 2/2000 | Puthuff et al. |
| 6,438,245 | B1 | 8/2002 | Taenzer et al. |
| 7,702,121 | B2 | 4/2010 | Husung et al. |
| 8,280,086 | B2 | 10/2012 | Topholm |
| 8,559,663 | B1 | 10/2013 | Sacha et al. |
| 8,712,083 | B2 | 4/2014 | Solum |
| 8,804,988 | B2 | 8/2014 | Solum et al. |
| 8,891,793 | B1 | 11/2014 | Sacha et al. |
| 9,161,139 | B2 | 10/2015 | Sacha et al. |
| 2003/0076974 | A1 | 4/2003 | Barthel et al. |
| 2003/0112862 | A1* | 6/2003 | Joe .......................... H04L 27/12 375/238 |
| 2003/0149526 | A1* | 8/2003 | Zhou et al. .................. 701/213 |
| 2004/0190739 | A1 | 9/2004 | Bachler et al. |
| 2004/0234090 | A1 | 11/2004 | Berg |
| 2005/0058313 | A1 | 3/2005 | Victorian et al. |
| 2005/0111401 | A1 | 5/2005 | Terry |
| 2007/0009123 | A1 | 1/2007 | Aschoff et al. |
| 2007/0009124 | A1 | 1/2007 | Larsen |
| 2007/0066297 | A1 | 3/2007 | Heidari-Bateni |
| 2007/0274550 | A1 | 11/2007 | Baechler et al. |
| 2008/0165829 | A1 | 7/2008 | Lee et al. |
| 2008/0260180 | A1 | 10/2008 | Goldstein et al. |
| 2009/0010464 | A1 | 1/2009 | Kornagel |
| 2010/0057472 | A1 | 3/2010 | Zeng et al. |
| 2010/0148931 | A1 | 6/2010 | Pappu et al. |
| 2010/0195836 | A1 | 8/2010 | Platz |
| 2010/0208631 | A1 | 8/2010 | Zhang et al. |
| 2010/0246865 | A1 | 9/2010 | Suurballe |
| 2010/0246866 | A1 | 9/2010 | Swain et al. |
| 2010/0303268 | A1 | 12/2010 | Frerking et al. |
| 2011/0032071 | A1 | 2/2011 | Tondering |
| 2011/0249836 | A1 | 10/2011 | Solum et al. |
| 2011/0249837 | A1 | 10/2011 | Galster et al. |
| 2012/0177235 | A1 | 7/2012 | Solum |
| 2014/0198937 | A1 | 7/2014 | Sacha et al. |
| 2015/0071469 | A1 | 3/2015 | Solum et al. |

FOREIGN PATENT DOCUMENTS

| | | |
|---|---|---|
| WO | WO-9848526 A2 | 10/1998 |
| WO | WO-0022874 A2 | 4/2000 |
| WO | WO-2007068243 A1 | 6/2007 |
| WO | WO-2009063097 A2 | 5/2009 |
| WO | WO-2009076949 A1 | 6/2009 |

OTHER PUBLICATIONS

"U.S. Appl. No. 12/776,038, Notice of Allowance mailed Jan. 18, 2013", 9 pgs.

"U.S. Appl. No. 12/776,038, Notice of Allowance mailed Jun. 10, 2013", 9 pgs.

"U.S. Appl. No. 12/776,038, Response filed Dec. 26, 2012 to Non Final Office Action mailed Sep. 27, 2012", 7 pgs.

"U.S. Appl. No. 12/823,505, Response filed Feb. 4, 2014 to Non Final Office Action mailed Nov. 4, 2014", 8 pgs.

"U.S. Appl. No. 12/823,505, Response filed Apr. 23, 2013 to Non Final Office Action mailed Jan. 23, 2013", 12 pgs.

"U.S. Appl. No. 12/823,505, Advisory Action mailed Oct. 4, 2013", 3 pgs.

"U.S. Appl. No. 12/823,505, Final Office Action mailed Apr. 29, 2014", 11 pgs.

"U.S. Appl. No. 12/823,505, Final Office Action mailed Jul. 18, 2013", 9 pgs.

"U.S. Appl. No. 12/823,505, Non Final Office Action mailed Jan. 23, 2013", 11 pgs.

"U.S. Appl. No. 12/823,505, Non Final Office Action mailed Nov. 4, 2013", 9 pgs.

"U.S. Appl. No. 12/823,505, Notice of Allowance mailed Jul. 18, 2014", 9 pgs.

"U.S. Appl. No. 12/823,505, Response filed Jun. 30, 2014 to Final Office Action mailed Apr. 29, 2014", 8 pgs.

"U.S. Appl. No. 12/823,505, Response filed Sep. 4, 2013 to Restriction Requirement mailed Aug. 2, 2013", 6 pgs.

"U.S. Appl. No. 12/823,505, Response filed Sep. 18, 2013 to Final Office Action mailed Jul. 18, 2013", 8 pgs.

"U.S. Appl. No. 12/823,505, Response filed Dec. 19, 2012 to Restriction Requirement mailed Oct. 19, 2012", 6 pgs.

"U.S. Appl. No. 12/823,505, Restriction Requirement mailed Aug. 2, 2012", 6 pgs.

"U.S. Appl. No. 12/823,505, Restriction Requirement mailed Oct. 19, 2012", 6 pgs.

"U.S. Appl. No. 12/981,035, Advisory Action mailed Jul. 11, 2013", 3 pgs.

"U.S. Appl. No. 12/981,035, Final Office Action mailed Jan. 15, 2014", 17 pgs.

"U.S. Appl. No. 12/981,035, Final Office Action mailed Apr. 8, 2013", 17 pgs.

"U.S. Appl. No. 12/981,035, Non Final Office Action mailed Aug. 29, 2013", 17 pgs.

"U.S. Appl. No. 12/981,035, Non Final Office Action mailed Nov. 20, 2012", 16 pgs.

"U.S. Appl. No. 12/981,035, Notice of Allowance mailed Apr. 1, 2014", 9 pgs.

"U.S. Appl. No. 12/981,035, Response filed Feb. 20, 2013 to Non Final Office Action mailed Nov. 30, 2012", 7 pgs.

"U.S. Appl. No. 12/981,035, Response filed Mar. 17, 2014 to Final Office Action mailed Jan. 15, 2014", 8 pgs.

"U.S. Appl. No. 12/981,035, Response filed Jun. 10, 2013 to Final Office Action mailed Apr. 8, 2013", 7 pgs.

"U.S. Appl. No. 12/981,035, Response filed Nov. 27, 2013 to Non Final Office Action mailed Aug. 29, 2013", 7 pgs.

"European Application Serial No. 11250442.8, Extended European Search Report mailed Aug. 18, 2011", 6 pgs.

"European Application Serial No. 11250442.8, Response filed Apr. 17, 2012 to Extended Search Report mailed Aug. 18, 2011", 28 pgs.

"U.S. Appl. No. 13/253,550, Non Final Office Action mailed Aug. 8, 2013", 12 pgs.

"U.S. Appl. No. 13/253,550, Notice of Allowance mailed Dec. 11, 2013", 11 pgs.

"U.S. Appl. No. 13/253,550, Response filed Nov. 8, 2013 to Non Final Office Action mailed Aug. 8, 2013", 7 pgs.

"U.S. Appl. No. 14/022,566, Non Final Office Action mailed Jan. 20, 2015", 6 pgs.

"U.S. Appl. No. 14/022,566, Notice of Allowance mailed Jun. 5, 2015", 9 pgs.

"U.S. Appl. No. 14/022,566, Response filed Apr. 20, 2015 to Non Final Office Action mailed Jan. 20, 2015", 8 pgs.

"U.S. Appl. No. 14/452,625, Non Final Office Action mailed Apr. 6, 2015", 15 pgs.

"U.S. Appl. No. 14/452,625, Preliminary Amendment filed Nov. 21, 2014", 8 pgs.

"U.S. Appl. No. 14/452,625, Response filed Jul. 6, 2015 to Non Final Office Action mailed Apr. 6, 2015", 8 pgs.

"European Application Serial No. 11184383.5, Extended European Search Report mailed Jul. 31, 2012", 7 pgs.

"European Application Serial No. 11184383.5, Office Action mailed Mar. 8, 2013", 7 pgs.

"European Application Serial No. 11184383.5, Response filed Feb. 14, 2013 to Extended European Search Report mailed Jul. 31, 2012", 23 pgs.

"European Application Serial No. 11184383.5, Response filed Jul. 12, 2013 to Office Action mailed Mar. 8, 2013", 11 pgs.

"European Application Serial No. 11184383.5, Summons to Attend Oral Proceedings mailed Aug. 29, 2013", 5 pgs.

"European Application Serial No. 11250442.8, Examination Notification Art. 94(3) mailed Mar. 25, 2015", 5 pgs.

"U.S. Appl. No. 14/452,625, Final Office Action mailed Aug. 21, 2015", 17 pgs.

"U.S. Appl. No. 14/452,625, Response filed Oct. 21, 2015 to Final Office Action mailed Aug. 21, 2015", 7 pgs.

(56) References Cited

OTHER PUBLICATIONS

"European Application Serial No. 11250442.8, Response filed Jul. 30, 2015 to Examination Notification Art. 94(3) mailed Mar. 25, 2015", 11 pgs.

U.S. Appl. No. 12/776,038, filed May 7, 2010, Method and apparatus for Dectecting Cellular Telephones for Hearing Assistance Devices.

U.S. Appl. No. 14/022,566, filed Sep. 10, 2013, Method and apparatus for Dectecting Cellular Telephones for Hearing Assistance Devices.

U.S. Appl. No. 12/981,035, filed Dec. 29, 2010, Control of Low Power or Standby Modes of a Hearing Assistance Device.

U.S. Appl. No. 12/823,505, filed Jun. 25, 2010, Remote Control for a Hearing Assistance Device.

U.S. Appl. No. 14/452,625, filed Aug. 6, 2014, Control of Low Power or Standby Modes of a Hearing Assistance Device.

* cited by examiner

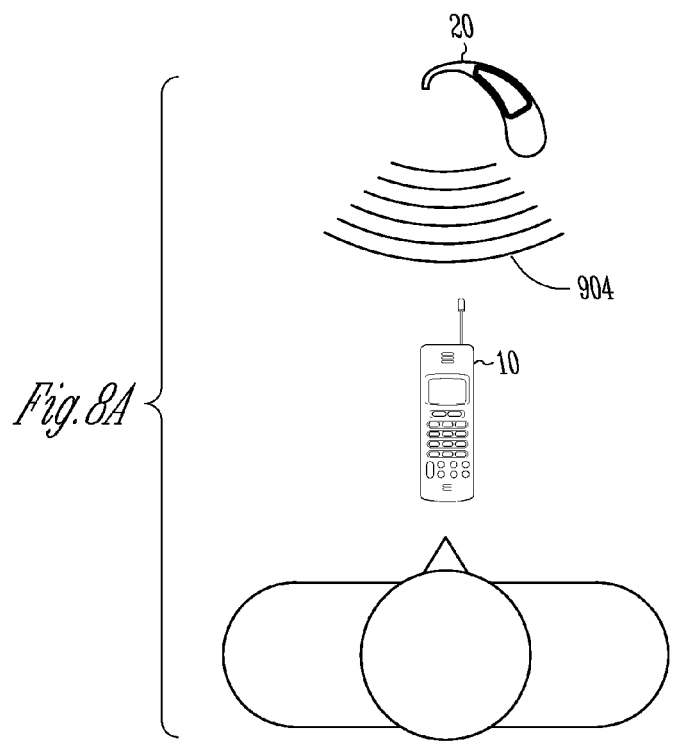
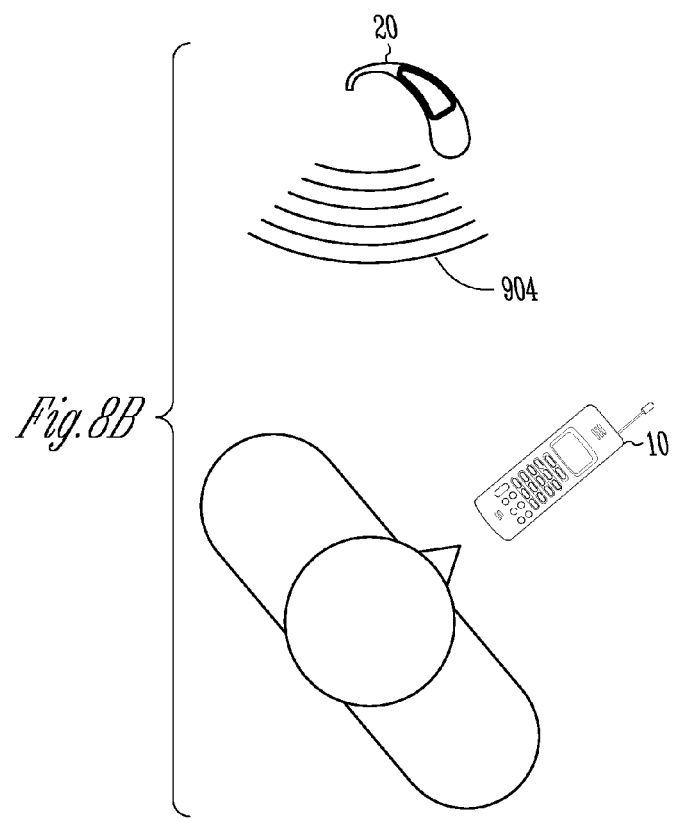

REMOTE CONTROL FOR A HEARING ASSISTANCE DEVICE

CLAIM OF PRIORITY

The present application is a divisional and claims the benefit of priority to U.S. patent application Ser. No. 12/823,505, filed Jun. 25, 2010, issued as U.S. Pat. No. 8,891,793, which application claims the benefit under 35 U.S.C. 119(e) of U.S. Provisional Patent Application Ser. No. 61/220,994, filed Jun. 26, 2009, which are hereby incorporated by reference in their entirety.

TECHNICAL FIELD

The present application relates to hearing assistance devices and more particularly using a personal wireless device as a remote control for a hearing assistance device.

BACKGROUND

Hearing assistance devices are used to improve hearing for wearers. Such devices include, but are not limited to, hearing aids. Hearing assistance devices provide user control of basic functions, such as volume control and power on/off, as well as having certain programmable settings and modes. However, buttons and dials on the housing of the hearing assistance device are small and can be difficult for a user to manipulate. In addition, some device settings can only be adjusted using a computer connection and proprietary software.

What is needed in the art is an improved system for controlling a hearing assistance device. The system should be available for use with various hearing assistance devices, such as hearing aids.

SUMMARY

The present subject matter provides systems and methods for remotely controlling a hearing assistance device, including using a personal wireless device such as a cellular telephone. One embodiment includes a communication system for controlling a hearing assistance device. The system includes a personal wireless device including a short range radio transmitter. The short range radio transmitter is programmed to transmit instructions to the hearing assistance device by conversion of inputs to the personal wireless device into control signals for the hearing assistance device using on/off keying of the short range radio transmitter.

Various embodiments include a method for converting a personal wireless device including a short range radio transmitter into a remote control for a hearing assistance device. Programming is provided that can be executed by the personal wireless device to convert inputs into commands that control the hearing assistance device. Programming is provided for the personal wireless device to convert the commands into wireless signals using on/off keying of the short range radio transmitter.

This summary is an overview of some of the teachings of the present application and is not intended to be an exclusive or exhaustive treatment of the present subject matter. Further details about the present subject matter are found in the detailed description and the appended claims. The scope of the present invention is defined by the appended claims and their equivalents.

BRIEF DESCRIPTION OF DRAWINGS

FIGS. 8A-8B illustrate a system to locate a hearing assistance device, according to one embodiment of the present subject matter.

DETAILED DESCRIPTION

Figure 1:
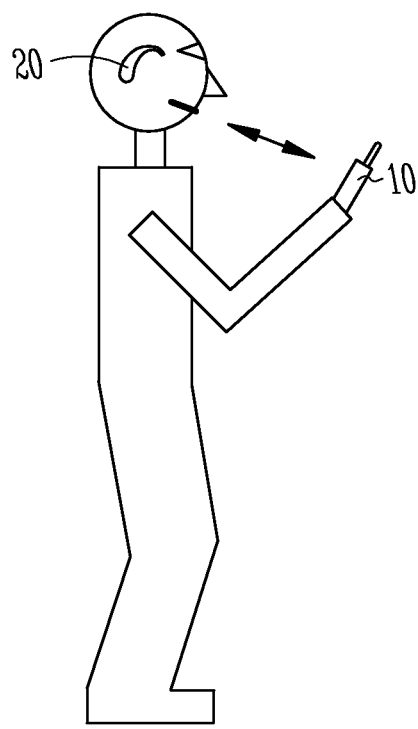
FIG. 1 illustrates a system including a personal wireless device and a hearing assistance device, according to one embodiment of the present subject matter.

The following detailed description of the present invention refers to refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter in various embodiments relates to method and apparatus for converting transmitters found in commercially available devices into remote controls for one or more hearing assistance devices by modification of the transmissions from the transmitters. The present subject matter relates to computer executable instructions for controlling transmitters and for providing an interface for operating such transmitters. The present subject matter in various embodiments relates to detectors for hearing assistance devices to detect signals from wireless remote controls.

In one embodiment of the present subject matter, a personal wireless device having a conventional transmitter is modified to provide simple on/off keying (OOK) signals to control operation of one or more hearing assistance devices adapted to receive the signals. In one application, a BLUETOOTH transmitter in a cellular phone or other personal wireless device is programmed to perform the on/off keying. In such embodiments, a software and/or firmware download is provided to the cellular phone to provide at least a primitive interface for controlling the OOK signals from the cellular phone. The hearing assistance device, such as a hearing aid, is adapted to receive the OOK signals and control a setting, function, or mode of the device based on the OOK signals.

In various embodiments, the present OOK keying is performed using a BLUETOOTH transmitter, but without employing the traditional BLUETOOTH protocol to key the BLUETOOTH transmitter. In such embodiments, a custom program is loaded into a cellular phone to control its BLUETOOTH transmitter. The custom program can assign certain functions to the cell phone, such that when certain "buttons" or other inputs are activated, a pre-assigned burst sequence is emitted by the BLUETOOTH transmitter. In such applications a hearing assistance device, such as a hearing aid can be used to detect the burst using envelope detection to demodulate the signal and perform a function corresponding to the pre-assigned burst sequence. A variety of approaches can be used to enable a hearing aid to detect transmissions from a personal wireless device, such as a cellular phone. One such approach includes, but is not limited to, the approach set forth in U.S. Provisional Patent Application Ser. No. 61/176,734, filed May 8, 2009, titled: CELL PHONE DETECTION FOR HEARING AIDS, which is incorporated by reference in its entirety.

It is understood that a nonconventional modulation approach can be employed with the present application. Thus, the present subject matter allows for the use of any transmitter that can be on and off keyed, without having to use a protocol designed for transmissions by that transmitter. Thus, in certain embodiments, the BLUETOOTH protocol is not necessary provided that the transmitter can be turned on and off according to the non-standard pre-assigned keying sequence.

In various embodiments, the custom program is a firmware download to the cellular phone. The downloaded code can be adapted to provide a unique control screen for the hearing assistance device. In applications relating to hearing aids, it is possible to control basic hearing aid functions, including, but not limited to volume control, and power on/off. Mode control can also be performed, such as the selection of wireless modes, such as a telecoil mode selection. Parameters may be selected, including, but not limited to, parameters relating to environment for example. It is understood that the program executing on the personal wireless device can provide inputs to the hearing assistance device that are commands issued by the wearer, or are inputs that are processed into instructions for the hearing assistance device. New hearing aid functions, such as battery life and related prompts can be supported.

In various embodiments, the communications between the hearing assistance device and the personal wireless device are unidirectional. In various embodiments, the communications are bidirectional. One way to accomplish bidirectional communications is via the use of the wireless communication from the personal wireless device to the hearing assistance device, and a return wireless communication from the hearing assistance device to the personal wireless device. Such return wireless communication can be accomplished by an audio communication, or by a short range electromagnetic communication. It is also possible that sensors on the personal wireless device could be used to transmit information to the hearing assistance device. For example, in the cellular phone/hearing aid system, the cellular phone microphone could be used to send information to the hearing assistance device. Other sensor applications are possible without departing from the scope of the present subject matter. Other personal communication devices may be used to control the hearing assistance device. For example, an IPOD or other wireless or wireless-assisted device may be used.

The present subject matter allows a user of a cell phone to hold the cell phone naturally to control the hearing assistance device. As shown in FIG. 1, it also allows the user to view the screen while controlling the hearing assistance device. The hearing assistance device 20 of FIG. 1 is depicted as a standard hearing aid, such as a behind-the-ear or receiver-in-the-ear standard hearing aid; however it is understood that other hearing aids can be controlled by the personal wireless device 10. Additionally, personal wireless device 10 is shown as a cellular phone, but it is understood that other personal wireless devices may be used without departing from the present subject matter.

Figure 2:
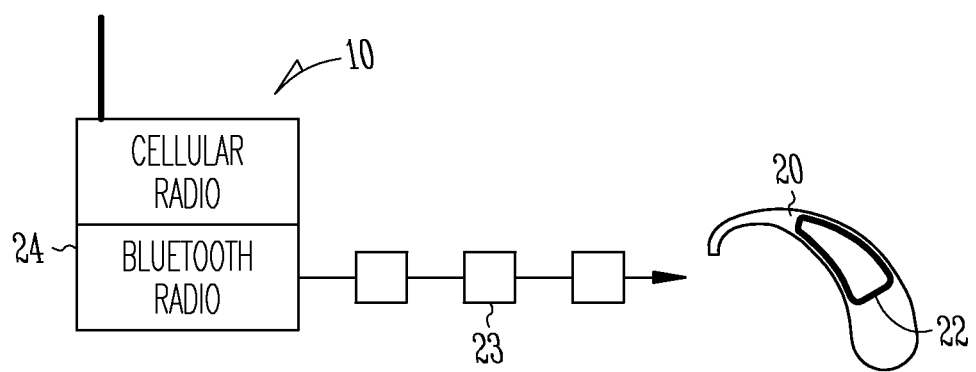
FIG. 2 illustrates a communication system between a personal wireless device including a short range radio transmitter and a hearing assistance device, according to one embodiment of the present subject matter.

As shown in FIG. 2, according to one embodiment, on/off Keying (OOK) modulation 23, or some other modulation scheme, emitted from the personal wireless device 10, such as a cellular phone, is used to control hearing aid 20 function, settings, and modes. Personal wireless device 10 is shown as a cellular phone with a BLUETOOTH compatible transmitter 24; however it is understood that other types of transmitters and a variety of different protocols may be used without departing from the scope of the present subject matter. Hearing aid 20 is shown as having an antenna 22 for receipt of the OOK modulation 23 (or other modulation). This can be accomplished using at least the following modulation approaches, including but not limited to: bursting the transmitter 24 with the appropriate OOK signal sequence; bursting a Wi-Fi transmitter 24; performing FM band transmissions from an FM transmitter 24; and bursting a BLUETOOTH transmitter 24 in a BLUETOOTH capable wireless device 10, such as a cellular phone.

Figure 3:
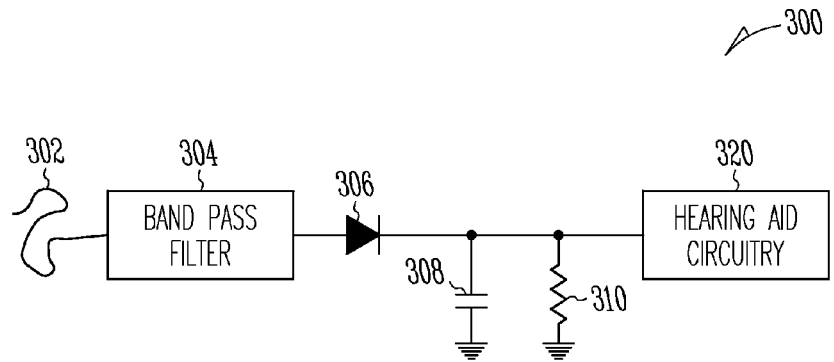
FIG. 3 illustrates a communication circuit for a hearing assistance device, according to one embodiment of the present subject matter.

A diode detector circuit 300 for receiving the OOK signal sequence is shown in FIG. 3, according to one embodiment of the present subject matter. The signals received by the antenna 302 are passed through a filter 304, which is a band pass filter in one embodiment. The signal is rectified via high frequency diode 306 and the resulting rectified signal is filtered by the capacitor 308 and resistor 310. The resulting filtered signal at node GPIO is sent to hearing aid circuitry 320 for detection. In one embodiment antenna 302 is a trace antenna; however, it is understood that different antennas may be used without departing from the scope of the present subject matter.

Figure 4:
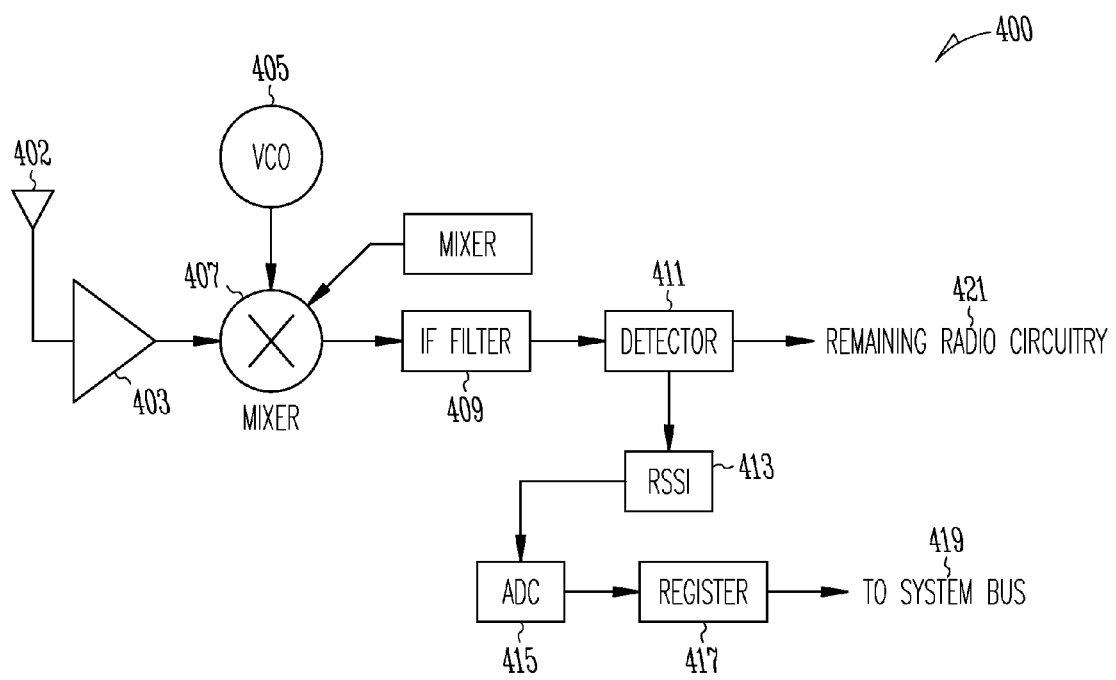
FIG. 4 illustrates a detection circuit for a hearing assistance device, according to one embodiment of the present subject matter.

Another detection circuit 400 is provided by FIG. 4. Antenna 402 receives wireless signals from the personal wireless device 10. The received signal is amplified by a low noise amplifier (LNA) 403. The resulting signal is converted to an intermediate frequency signal using mixer 407 which also uses an output from a voltage controlled oscillator 405 for the conversion. The resulting signal is filtered using intermediate frequency filter 409 and its output is fed into a detector 411. The detector 411 provides a signal for the remaining radio circuitry 421 and a signal for a received signal strength indicator (RSSI) 413. In various embodiments, the detector 411 is programmed to detect the particular OOK signaling provided by the personal wireless device 10. The output of the detector 411 and/or the RSSI 413 is converted into digital information using analog-to-digital converter 415. The resulting digital signal can be stored in a register 417 and subsequently sent to the system bus 419 of a processor. Other configurations may exist without departing from the scope of the present subject matter.

Figure 5:
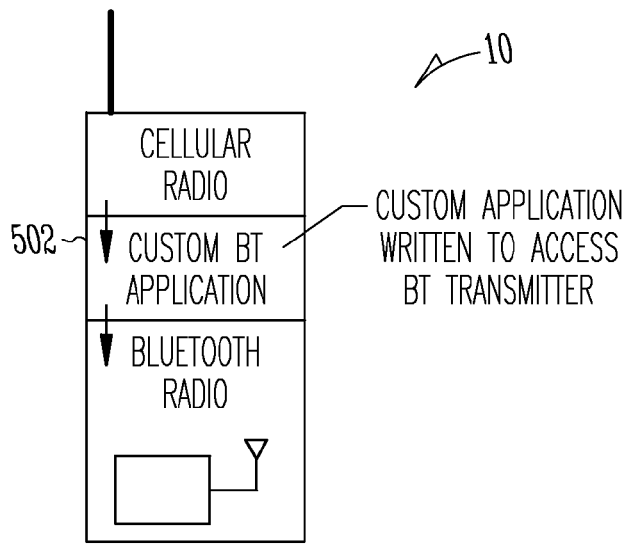
FIG. 5 illustrates a personal wireless device with a custom software application, according to one embodiment of the present subject matter.

FIG. 5 shows a personal wireless device 10 with a custom software application 502 according to one embodiment of the present subject matter. The custom software application 502 executing on the personal wireless device 10 can be deployed on open platform cellular phones, including, but not limited to the IPHONE or GOOGLE ANDROID platforms. Other proprietary cellular phone platforms and other wireless portable devices may be used in various embodiments. The custom software application can be written in high level or low level languages, and it can be implemented in firmware, software, or as a combination of software and firmware. The code can be downloaded in a variety of ways. Other code variations are possible without departing from the scope of the present subject matter.

Using various embodiments of the custom software application 502, a user can conveniently control hearing aid functionality by manipulating a cellular phone input including, but not limited to, a key pad or touch screen "soft" controls. User inputs are mapped to appropriate transmitter envelope patterns (modulation).

Figure 6:
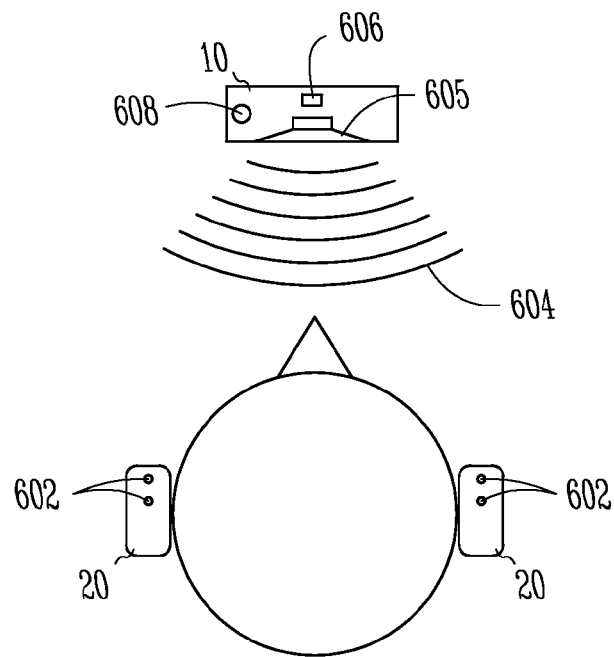
FIG. 6 illustrates a communication system using sound waves between a personal wireless device and a hearing assistance device, according to one embodiment of the present subject matter.

As demonstrated in FIG. 6, sound waves 604 emanating from the personal wireless device speaker 605 can be used to send information to one or more microphone ports 602 of one or more hearing assistance devices 20. The sound waves 604 can be encoded with different information. In one embodiment, such information includes, but is not limited to, information from microphone 606 of the personal wireless device 10. Thus, the transmission of sound permits a transfer of information from the personal wireless device 10, such as a cellular phone or other wireless device having an antenna 608. Communications from the personal wireless device 10 to the one or more hearing assistance devices 20 can be performed using the OOK modulation or other such modulation. In various embodiments, the radio transmission and sound transmission can be used in conjunction with each other to perform functions. For example, the radio transmission can be used to place the hearing assistance devices on standby and then a sound signal can be sent to obtain measurements such as relative delay between microphones, for example. It is understood that the sound information can also lead the wireless information, or come at substantially the same time. In one embodiment, the sound waves 604 emanating from speaker 605 are used to calibrate the microphones receiving sound from microphone ports 602. In one approach an application on the personal wireless device is executed which sends a signal from the speaker 605 that is used to calibrate the microphones. In one embodiment, the hearing assistance devices enter a calibration mode upon audio reception of the sound. In one embodiment, a wireless radio signal is used to place one or more hearing assistance devices in calibration mode. The hearing assistance devices can perform microphone calibration by looking at relative amplitude between two or more microphones. The amplitude of the microphone signals can be equalized by adjusting gain using a filter or filter function. Another application is to monitor delay and adjust that delay based on the difference between microphone reception times. In one application, relative reception times are used to equalize phase of the microphones or to optimize the delay between the microphones for a desired directivity pattern. In one application, a timing or phase reference is employed. The hearing assistance device, in various embodiments, can be programmed to equalize the delays of reception of sound. In various applications an all-pass filter can be used to tailor the phase characteristic of one or more microphones. Other applications are possible without departing from the scope of the present subject matter.

By establishing even a low level link between a cellular phone and a hearing assistance device, such as a hearing aid, a number of new functions are enabled. For example, a custom phone application that accesses a mapping service, such as GOOGLE MAPS for instance, can create a "driving detector" that senses motion of the wearer of the hearing assistance device. By accessing the map data and tracking it, a determination could be made if the user is on a road. If user is determined to be on a road or traveling at a certain velocity then an assumption can made that they are in a car. In certain embodiments, additional "filters" can help determine user-on-road situations that are not car related, such as merely crossing a road or riding a bike on a roadway.

There are many other functions that employ the present subject matter to enrich a user's experience. Such other functions include, but are not limited to: driving/car detection, remote microphone functions, extended remote microphone functions, such as from a remote phone to a local wireless device to a wearer's hearing assistance device, a battery-store-in-vicinity, an audiologist-in-vicinity, an on-the-ear microphone calibration, an occluded microphone check and other microphone readings.

Figure 9:
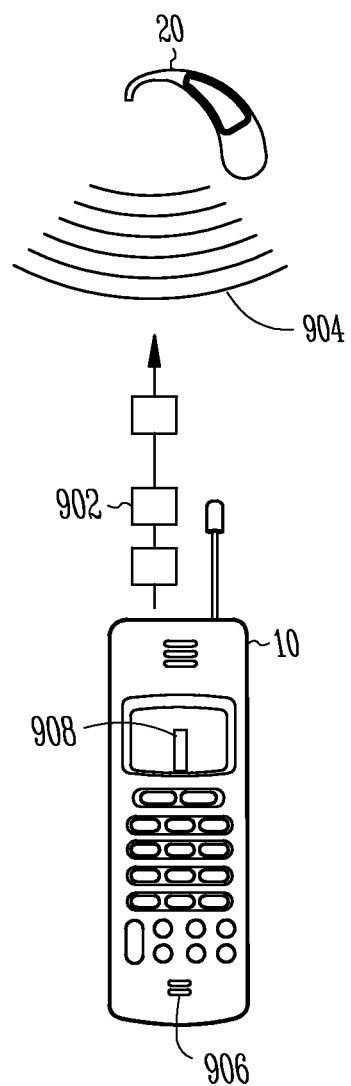
FIG. 9 illustrates a system to remotely control a hearing assistance device using on/off keying (OOK) modulation, according to one embodiment of the present subject matter.

FIGS. 8 and 9 show that the present subject matter can be used to perform location of a hearing aid. FIG. 9 shows that a wireless code 902 can be transmitted from personal wireless device 10 to the hearing assistance device 20 (e.g., a hearing aid) to turn on a sound emission 904. A user with some hearing ability may be able to detect where the hearing assistance device 20 is located from the sound emission 904. A user with little hearing ability can move the personal wireless device 10 around and use a microphone 906 supplying a signal to a signal strength meter 908 to determine where the hearing assistance device 20 is located. As shown in FIG. 8A, the sound emission registers a larger signal strength when the personal wireless device is closer to the hearing assistance device or, if a directional microphone is used, when the microphone of the personal wireless device is pointed closer to the hearing assistance device. FIG. 8B shows that a weaker signal is registered if the personal wireless device is further away or pointing away from the hearing assistance device. For example, if a hearing aid is misplaced a personal wireless device or other wireless remote can be instructed to transmit a unique code that turns on an internal oscillator within the hearing aid and outputs the resulting sound at a high volume through the hearing aid speaker. If the acoustic signature used is unique then the wireless device microphone can "listen" and give a visual indication if it detects the missing hearing aid tone within some radius. One type of output that can be shown to a hearing impaired person is a visual tool signal strength to give the person direction and gross distance indication to locate his/her device. Many other interfaces using the teachings of the present subject matter are possible.

In various embodiments, the software download to the wireless handheld device includes programming software adapted to program hearing aids. In such embodiments, hearing aid adjustments can be made using the wireless handheld device. An audiologist can perform programming and adjustments using the wireless handheld device as an interface. Such adjustments can be made using remote access to a patient's audiogram and other data.

Figure 7:
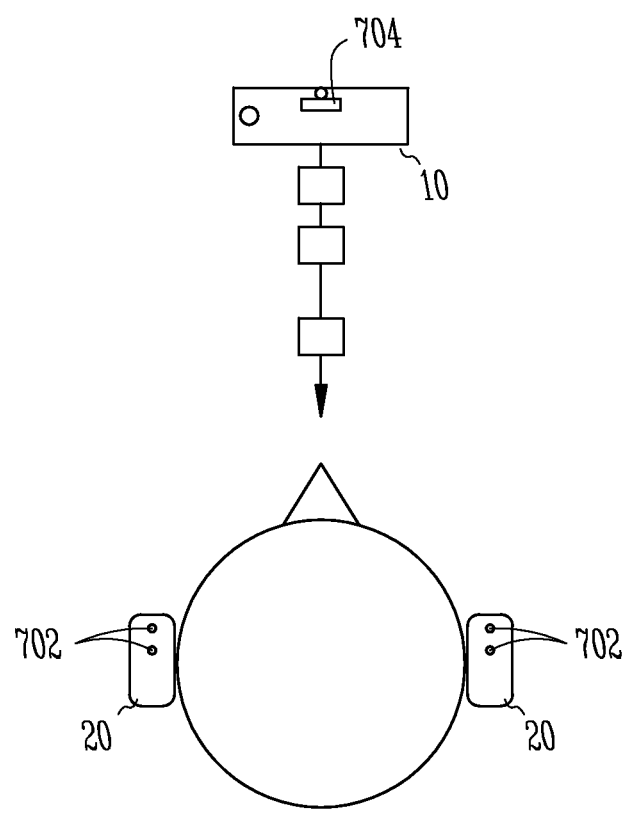
FIG. 7 illustrates a personal wireless device configured to create a microphone array, according to one embodiment of the present subject matter.

FIG. 7 demonstrates how a remote microphone on the personal wireless device is configured to create a microphone array, according to one embodiment of the present subject matter. In this example, the system sums signals received by the cellular phone microphone 704 with signals received by one or more microphones 702 from one or more hearing assistance devices 20. The radio frequency link can be used to send the cellular phone microphone signal for mixing by one or both hearing assistance devices 20. The overall system has a controllable directionality that can range across larger distances than with traditional approaches.

The present subject matter includes hearing assistance devices, including, but not limited to, cochlear implant type hearing devices, hearing aids, such as behind-the-ear (BTE), in-the-ear (ITE), in-the-canal (ITC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having a receiver in-the-canal. It is understood that other hearing assistance devices not expressly stated herein may fall within the scope of the present subject matter.

It is understood one of skill in the art, upon reading and understanding the present application will appreciate that variations of order, information or connections are possible without departing from the present teachings. This application is intended to cover adaptations or variations of the present subject matter. It is to be understood that the above description is intended to be illustrative, and not restrictive. The scope of the present subject matter should be determined with reference to the appended claims, along with the full scope of equivalents to which such claims are entitled.

What is claimed is:

1. A communication system for controlling a hearing assistance device, the system comprising: a personal wireless device including a short range radio transmitter programmed to transmit instructions to the hearing assistance device by conversion of inputs to the personal wireless device into control signals for the hearing assistance device using on/off keying of the short range radio transmitter, wherein the on/off keying includes a burst sequence and wherein the burst sequence can be demodulated using an envelope detection and wherein the short range radio transmitter is configured to use a wireless technology standard for exchanging data, such as BLUETOOTH.

2. The communication system of claim 1, wherein the personal wireless device includes a cellular telephone.

3. The communication system of claim 1, wherein a pre-assigned burst sequence is emitted by the transmitter in response to an input to the personal wireless device.

4. The communication system of claim 1, wherein the hearing assistance device includes a detection circuit adapted to receive the encoded on/off keyed signals.

5. The communication system of claim 1, wherein the short range radio transmitter is programmed to transmit instructions to the hearing assistance device to control volume of the hearing assistance device.

6. The communication system of claim 1, wherein the short range radio transmitter is programmed to transmit instructions to the hearing assistance device to initiate bidirectional communication between the hearing assistance device and the personal wireless device.

7. The communication system of claim 6, wherein the short range radio transmitter is programmed to transmit instructions to the hearing assistance device to locate the hearing assistance device.

8. The communication system of claim 6, wherein the short range radio transmitter is programmed to transmit instructions to the hearing assistance device to detect motion of the hearing assistance device.

9. A personal wireless device, comprising: a short range radio transmitter configured as a remote control for a hearing assistance device; and a processor programmed to convert inputs into commands that control the hearing assistance device and further programmed to convert the commands into wireless signals using on/off keying of the short range radio transmitter, wherein the on/off keying includes a burst sequence and wherein the burst sequence can be demodulated using an envelope detection and wherein the short range radio transmitter is configured to use a wireless technology standard for exchanging data, such as BLUETOOTH.

10. The device of claim 9, wherein the processor is programmed to convert an input into one or more commands adapted to control a setting of the hearing assistance device.

11. The device of claim 9, wherein the processor is programmed to convert an input into one or more commands adapted to control a function of the hearing assistance device.

12. The device of claim 9, wherein the processor is programmed to convert an input into one or more commands adapted to control a mode of the hearing assistance device.

13. The device of claim 9, wherein the short range radio transmitter is programmed to transmit instructions to the hearing assistance device to initiate bidirectional communication between the hearing assistance device and the personal wireless device.

14. The device of claim 9, wherein the short range radio transmitter is programmed to transmit instructions to the hearing assistance device to control volume of the hearing assistance device.

15. The device of claim 9, wherein the processor is programmed to initiate a sound transmission from a speaker of the personal wireless device to the hearing assistance device.

16. The device of claim 15, wherein the sound transmission is used to calibrate a microphone of the hearing assistance device.

17. The device of claim 9, wherein the processor is programmed to initiate a transmission from the radio transmitter including a code to the hearing assistance device to initiate a transmission from the hearing assistance device.

18. The device of claim 17, wherein the processor is programmed to locate the hearing assistance device using the received transmission.

19. The device of claim 17, wherein the processor is programmed to detect motion of the hearing assistance device using the received transmission.

* * * * *